July 15, 1958  A. W. RYMILLS  2,843,148
SOFT CLOSING NOZZLE VALVE
Filed April 5, 1955  2 Sheets-Sheet 1
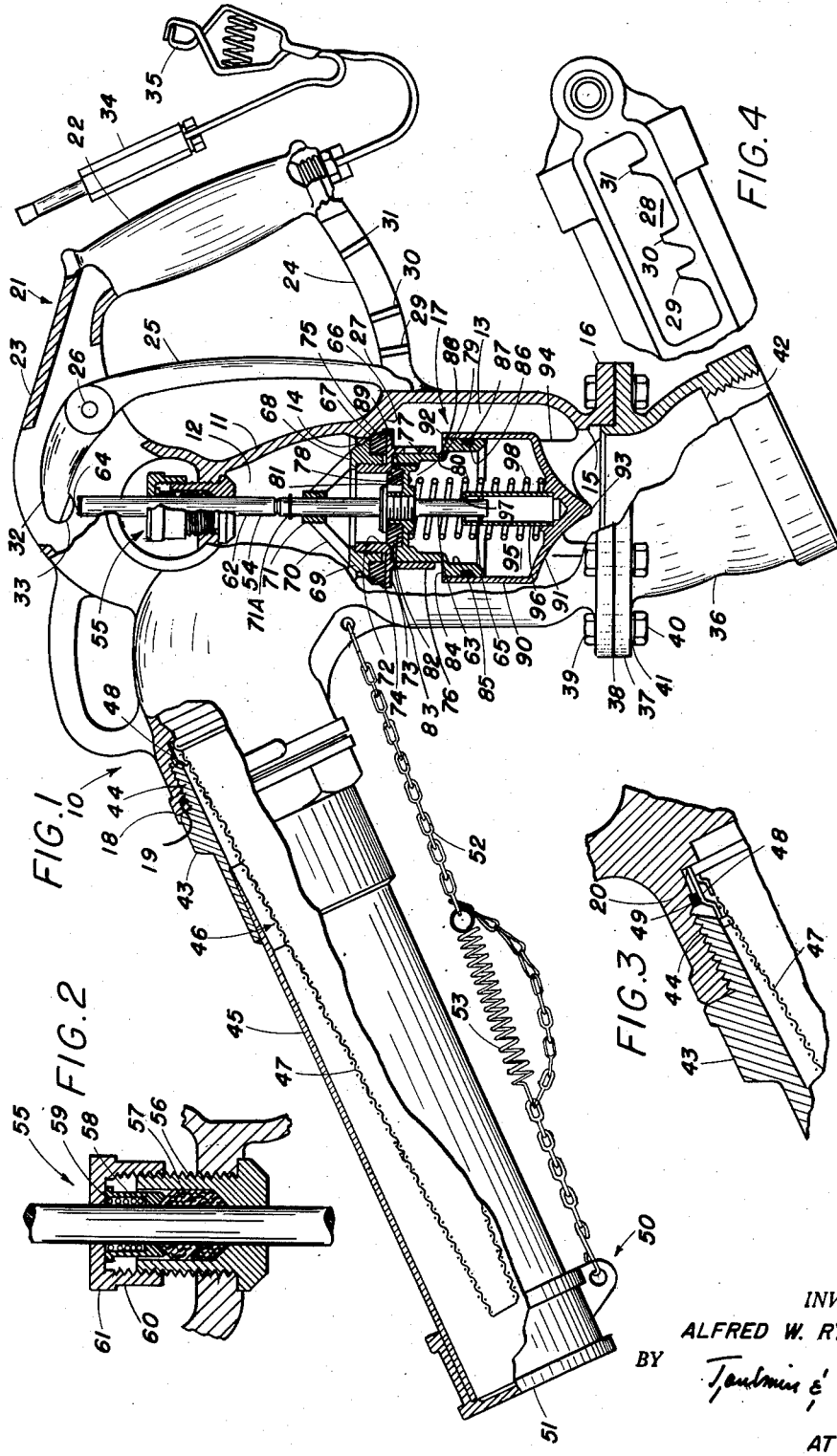
INVENTOR.
ALFRED W. RYMILLS
BY
Toulmin & Toulmin
ATTORNEYS July 15, 1958 A. W. RYMILLS 2,843,148
SOFT CLOSING NOZZLE VALVE
Filed April 5, 1955 2 Sheets-Sheet 2

INVENTOR.
ALFRED W. RYMILLS
BY
ATTORNEYS

United States Patent Office 2,843,148
Patented July 15, 1958

2,843,148

SOFT CLOSING NOZZLE VALVE

Alfred W. Rymills, Dayton, Ohio, assignor to Buckeye Iron & Brass Works, Dayton, Ohio, a corporation of Ohio Application April 5, 1955, Serial No. 499,375

8 Claims. (Cl. 137—599.2)

The present invention relates to a refueling nozzle, more particularly, to a quick-acting but slow-closing flow control nozzle valve assembly.

In devising valve assemblies for discharge nozzles, a constant objective has been the attainment of a valve assembly which is quick acting in both opening and closing. In addition, the valve assembly should present very little obstruction, if any, to the flow of fluid through the nozzle. By reducing all impediments to the flow to a minimum a rapid and steady flow of fluid will be obtained. The rapid flow of fluid through the nozzle is particularly desirable in refueling operations where large quantities of fuel must be dispensed in as short a period of time as possible.

Discharge nozzles have been devised which may discharge fluids at different rates of flow. In conventional practice a single valve is employed. The amount of opening between the valve and its cooperating valve seat determines the amount of flow through the valve and, consequently, the discharge by the nozzle. Varying the rate of flow in this manner, however, produces undesirable turbulence within the nozzle. This turbulence occurs due to the absence of steady state flow conditions through the valve. It is readily apparent that flow conditions will vary as the amount of opening in the valve is adjusted.

The present invention provides an improved refueling nozzle which eliminates the above disadvantages and incorporates the features desirable in a nozzle. The refueling nozzle of this invention essentially comprises a valve assembly comprising multiple valve units. The positioning of these valve units with respect to one another will produce various definite rates of flow. Manipulation of an operating lever will cause a first valve to permit a first rate of flow. Successive movement of the operating lever and positioning in a second position will result in a second valve opening to give a second rate of flow. Additional movement of the operating lever and positioning in a third position will result in the second valve being opened completely to result in full flow through the nozzle.

In order to eliminate any shock and discharge during the closing action of the valves, a dashpot is employed with one of the valve units. The dashpot has passages therein through which a portion of the fluid may be diverted to maintain the dashpot under pressure. The particular relationship of these passages with the first valve enables the pressure in the dashpot to be reduced before the closing impact of the valve. This reduction of pressure in the dashpot will cause a decrease in speed of the movable valve comprising the dashpot. Consequently, the closing action of the valve is accomplished at a rapid speed but the valve is slowed immediately prior to seating so as to eliminate any shocks from the seating of the valve.

Furthermore, by slowing down the speed of the valve immediately before closing, there is a more gradual shutting off of the flow of fluid through the nozzle which results in less disturbance in the valve structure.

This discharge nozzle also comprises an improved arrangement for securing a strainer assembly within the discharge spout. This arrangement comprises positioning a ring at the end of the discharge outlet of the valve body and retaining the ring in position by means of an adapter. The discharge tube is secured to the adapter. Consequently, when the adapter and discharge tube are secured to the discharge end of the valve body, a strainer which is attached to the ring will project into the discharge tube. This will enable the strainer assembly to be readily removed merely by detaching the adapter from the valve body.

It is therefore the principal object of this invention to provide an improvement in refueling nozzles.

It is another object of this invention to provide a novel and improved valve assembly for refueling nozzles.

It is a further object of this invention to provide a nozzle valve assembly having a plurality of definite flow rates to which the valve assembly may be readily adjusted.

It is an additional object of this invention to provide a nozzle valve assembly having a smooth, quick-closing action, accompanied by a minimum of shock and disturbance.

It is a still further object of this invention to provide a nozzle valve assembly having a smooth, quick-closing action, but wherein final seating of the valve on its valve seat is accomplished at a reduced speed.

It is a still further object of this invention to provide a refueling nozzle wherein various flow rates are achieved by coordinated interaction of a plurality of valve members.

Other objects and advantages of this invention will become apparent upon reference to the accompanying description when taken in conjunction with the following drawings wherein:

Figure 1 is a plan view of the refueling nozzle of this invention with portions thereof removed to show the details of attaching the strainer assembly to the valve body and to illustrate the details of the valve assembly;

Figure 2 is a longitudinal section view of the stuffing box assembly through which the valve stem extends;

Figure 3 is a partial sectional view showing in detail the adapter and strainer ring assembly;

Figure 4 is a plan view of the lever guard of the grip showing the adjustment notches;

Figure 5:
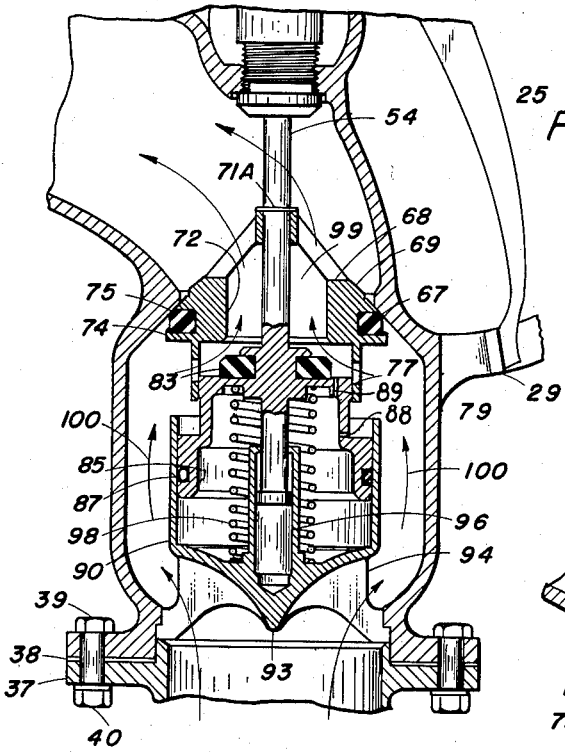
Figure 5 is a longitudinal sectional view through the valve body showing the positioning of the valve assembly as one-third flow.

Returning now to the drawings, more particularly to Figure 1, wherein like reference symbols indicate the same parts throughout the various views, 10 indicates generally a refueling nozzle constructed in accordance with this invention. The nozzle 10 essentially comprises a valve body 11 in which is formed a discharge chamber 12 and a valve chamber 13. The discharge chamber and valve chamber intercommunicate with each other and are divided by means of an annular shoulder 14 formed on the valve body.

The valve chamber 13 is essentially cylindrical in shape and has an inlet opening 15 which is surrounded by an external flange 16. Located within the valve chamber 13 is a valve assembly 17 which will be later described in detail.

The discharge chamber 12 extends from the annular shoulder 14 and is curved through an angle somewhat greater than 90°. At the free end of the discharge chamber 12 is an outlet 18 having internal threads 19 therein. There is an internal shoulder 20 formed adjacent the outlet 18 but inwardly of the threads 19.

There is a handle assembly 21 which comprises a hand grip 22 which is secured to the exterior of the valve body by means of an arm 23 and a lever guard 24. Both the arm and lever guard are preferably integral with the valve body. There is a curved operating lever 25 pivotally mounted on the arm 23 by means of a pivot pin 26.

The tail of the operating lever indicated at 27 is received in an elongated opening 28 in the lever guard 24 of the handle assembly. There are a plurality of projections or steps 29, 30 and 31 along one side of the opening 28 which form a plurality of notches in which the tail of the operating lever may be positioned.

The upper end of the operating lever, as indicated at 32, has a projecting cam surface 33 thereon, the purpose of which will be described later.

A ground assembly 34 is connected to a spring clip 35 which, in turn, is connected to the hand grip 22 of the handle assembly. The ground assembly permits the grounding of the refueling nozzle 10 so as to prevent the building up of static electricity therein due to the passage of fluid through the nozzle.

There is an inlet flange 36 secured to the flange 16 of the valve body. The inlet flange 36 has an external flange 37 thereon which is adapted to be attached to the flange 16. A gasket 38 is positioned between the cooperating flanges and the flanges are secured by means of cap screws 39, nuts 40, and lock washers 41.

There are internal threads 42 at the other end of the inlet flange 36.

Proceeding now to the discharge outlet 18 of the valve body, an adapter 43 having external threads 44 is threadedly engaged with the discharge outlet threads 19.

A discharge tube 45 is suitably secured within the adapter 43. Within the discharge tube 45 there is positioned a strainer assembly 46 which essentially comprises a conical-shaped strainer screen 47 which gradually tapers inwardly towards the outlet end of the discharge tube. The strainer screen 47 is secured to a ring 48 which, together with an O-ring 49, is retained against the shoulder 20 by means of the adapter 43.

A dust cap assembly 50 is provided to seal the outlet end of the discharge tube. The dust cap assembly comprises a dust cap 51, which is closely received upon the end of the discharge tube and attached to the valve body by means of a chain 52 kept in tension by a spring 53.

Returning now to the valve body 11, a valve stem 54 is slidably mounted in a stuffing box assembly 55 which is mounted in the wall of the discharge chamber 12.

Referring to Figure 2, the stuffing box assembly 55 comprises a side cap 56, which is threaded upwardly through the wall of the discharge chamber. There is a packing 57 within the side cap which is retained in position by means of a gland 58 and a gland spring 59. The gland and gland-spring bear against the inner end of a suffing box 60 which is threaded upon the side cap 56. There is a knurled rim 61 on the stuffing box 60 to permit ready adjustment of the stuffing box assembly.

The valve stem 54 comprises an upper stem 62 and a lower stem 63. The upper stem 62 projects through the stuffing box 55 outwardly of the valve body to a position where the upper end of the valve stem, as indicated at 64, is in engagement with the cam surface 33 on the operating lever.

There are a plurality of radially extending stops 65 adjacent the free end of the lower stem 63. The purpose of the stops 65 will be later described.

Referring to the annular shoulder 14 previously described, it may be seen that the shoulder 14 has an inclined surface 66 facing the valve chamber 13. A valve seat indicated at 67 is formed upon the inclined surface 66.

The valve assembly 17 within the valve body comprises a major valve 68 which consists of an annular valve head 69 secured by means of a plurality of radially extending arms 70 to a collar 71 which is slidably mounted on the upper stem 62 of the valve stem. The collar 71 is engageable with a retaining ring 71A mounted on the upper valve stem 62. The valve head 69 is threaded to an annulus 72 which has an external flange 73 integral therewith. There is a shoulder 74 on the outer periphery of the external flange 73 to retain a valve disc 75 between the valve head 69 and the annulus 72. The valve disc 75 is engageable with the valve seat 67 on the annular shoulder within the valve body.

There is a cylindrical extension 76 depending from the external flange 73. There are a plurality of circumferentially spaced ports 77 in the cylindrical extension 76.

At the junction of the annulus 72 and the external flange 73 of the major valve, there is a valve seat 78 which is engaged by a minor valve 79. The minor valve 79 comprises a cylindrical portion 80 having a closed end 81. The closed end 81 of the minor valve is secured to the valve stem 54 and serves to divide the upper and lower stems. There is an annular groove 82 on the outer surface of the closed end 81. A valve disc 83 is seated in the groove 82. The valve disc 83 is adapted to engage the valve seat 78 located on the major valve. The minor valve is slidably received within the cylindrical extension 76 of the major valve. The cylindrical portion 80 of the minor valve is slightly greater in length than the cylindrical extension 76.

At the lower end of the cylindrical portion 80 of the minor valve there is an external shoulder 84 to which is integrally secured an enlarged diameter portion 85 of the minor valve. There is an external annular groove 86 in the enlarged diameter portion 85. A resilient O-ring 87 is inserted within this annular groove.

There is a hole 88 in the cylindrical portion 80 of the minor valve just above the external shoulder 84. When the minor valve is completely received within the cylindrical extension 76 the hole 88 is not covered by the cylindrical extension.

There is a second hole 89 in the closed end 81 of the minor valve. The hole 89 is positioned outwardly of the valve disc 83.

A cylinder 90 having a closed end 91 and an open end 92 is positioned within the valve chamber. The closed end 91 is curved to a point 93 and is directed toward the inlet of the valve body. The cylinder 90 is stationarily mounted within the valve chamber by means of a plurality of arms 94 which connect the closed end 91 of the cylinder with the interior wall of the valve body. The enlarged diameter portion 85 of the minor valve is slidably received within the open end 92 of the cylinder to form a dashpot, indicated at 95. Located within the dashpot is a sleeve 96 secured to the inner face of the closed end 91. The sleeve 96 has an opening 97 in one end thereof, through which passes the lower valve stem 63. The stops 65 on the lower end of the lower valve stem are adapted to engage against the end of the sleeve 96 to prevent excessive movement of the valve stem.

There is a valve spring 98 surrounding the sleeve 96 and having one end positioned against the closed end 91 and the other end positioned against the closed end 81 of the minor valve.

With the above structure of the refueling nozzle and valve assembly in mind, the method of operation of the valve assembly in order to obtain the advantages of this nozzle will now be described.

For any operating pressure, the operating lever 25 may be positioned to give one-third, two-thirds or full flow by engaging its tail 27 in the appropriate step provided in the lever guard 24. Once the operating lever has been positioned, the nozzle will continue to discharge at that particular flow until the position of the operating lever has been readjusted. Since the lever is positioned in one of the steps, it is unnecessary to maintain manual pressure on the operating lever during the flow through the nozzle.

Proceeding to Figure 5, the position of the valve assembly is illustrated when the operating lever has been positioned in the notch 29 to give one-third flow. When the operating lever is positioned in notch 29 the valve stem is depressed by the action of the cam 33 on the upper end thereof. This axial movement of the valve stem will unseat the minor valve from the valve seat 78. Consequently, the fluid will pass through the ports 77 and through the throat of the major valve, as indicated at 99. The flow of fluid is indicated by the flow lines 100.

Figure 6:
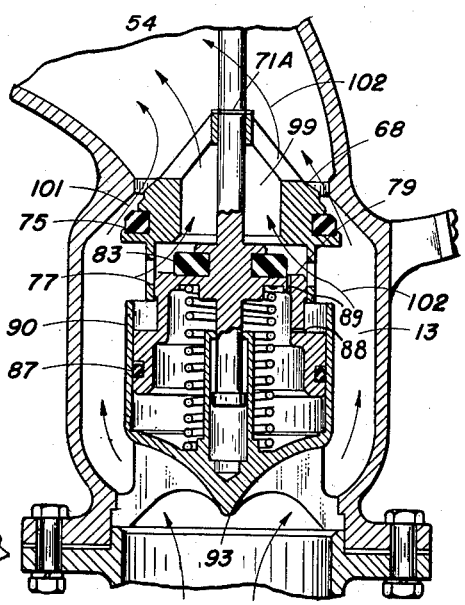
Figure 6 is a view similar to Figure 5 showing the valve assembly in position at two-thirds flow.

To obtain two-thirds flow, the operating lever 25 is positioned on step 30. This positioning of the operating lever results in further axial movement of the valve stem. The position of the various components of the valve assembly for two-thirds flow is illustrated in Figure 6.

This additional movement of the valve stem results in the retaining ring 71A engaging the collar 71 to depress the major valve. This results in the valve disc 75 becoming unseated in the valve seat 67. Consequently, there is an additional flow of fluid resulting from the unseating of the major valve. Thus, the flow of fluid when the valve is in a two-thirds flow position is through the ports 77 and through the opening, indicated at 101. The flow lines for two-thirds flow are indicated at 102.

To obtain full flow, the operating lever is positioned in step 31. This positioning of the operating lever causes further downward axial movement of the valve stem. This movement depresses the valve stem to its maximum position to result in completely opening the space 101. Consequently, a major proportion of the flow under full flow conditions is through the space 101 with additional flow taking place through the ports 77 in the manner previously described.

It is pointed out that the areas of the various ports are controlled diametrically rather than axially. Consequently, slight variations in the actual positions of the various valves relative to their seats will not appreciably affect the flow through the nozzle.

The flow of fluid through the nozzle is stopped by removing the operating lever from the step into which it has been positioned and permitting the lever to pivot to the position shown in Figure 1. When the restraining force of the lever has been removed from the upper end of the valve stem, the valve spring 98 will move the valve stem upwardly. This upward movement of the valve stem results in immediate closure of the major valve. This closure occurs because the major valve is slidably mounted upon the valve stem. When the restraining force of the retaining pin is removed from the collar of the major valve, the fluid impinging on the under side of the major valve will result in the closure thereof. Simultaneously during this upward movement of the valve stem, the valve spring exerts a force which urges the minor valve into closing position. During this closing movement of the valve assembly, the dashpot 95 functions to lessen the impact of the closing of the valves.

Figure 7:
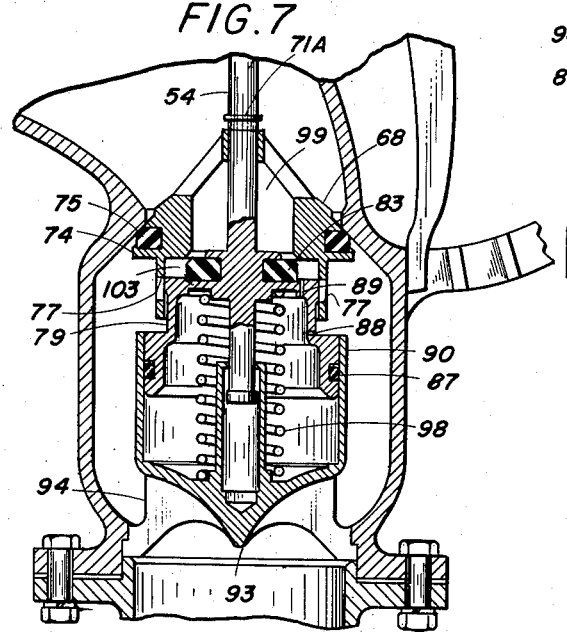
Figure 7 is a sectional view similar to that of Figure 5 and showing the valve assembly at the point of closing.

During the flow of fluid through the open valves, the holes 88 and 89 enable the fluid to enter the dashpot at a moderate speed. Fluid will consequently be flowing into the dashpot 95 until the valves assume the position illustrated in Figure 7. Figure 7 illustrates the position of the valve assembly at the point of closing. In this position it may be seen that the minor valve restricts flow through ports 77. However, the minor valve is not yet seated against its cooperating valve seat. Consequently, there is a drop in pressure in the chamber, indicated at 103, with a resultant reverse flow of fluid through hole 89. This reverse flow of fluid through the hole 89 will result in fluid flowing out of the dashpot, but at a slightly greater rate of flow to that which enters the dashpot through hole 88, there being a little difference in their areas. Due to this difference in area between the holes 88 and 89, a drop in pressure will occur within the dashpot 95.

This decrease in the dashpot pressure plus the opposing pressure upon the external shoulder 84 will result in slowing the final closing action of the minor valve. The ultimate seating of the minor valve therefore will be accomplished without an impact on the valve seat which would tend to set up shocks within the valve assembly. The result is a quick-acting, smooth closing valve.

Thus it can be seen that the present invention discloses an improved discharge nozzle. Because of the cushioning effect of the dashpot on the minor valve, a quick-acting but smooth closing nozzle is obtained. In addition, the operating lever may be positively positioned to obtain any one of several definite rates of flow. The rates of flow are achieved by providing different flow passages from a coordinated interaction of multiple valves in a valve assembly. A small number of components of the valve assembly result in a simplified, yet effective, valve.

It is pointed out that the refueling nozzle of this invention is particularly adapted for air force, truck and bus depots, where it is desired to dispense large quantities of fuel in a short period of time. It should be borne in mind that minor modifications to the refueling nozzle will readily adapt the nozzle for use in the conventional filling station.

It will be understood that this invention is susceptible to modification in order to adapt it to different usages and conditions, and, accordingly, it is desired to comprehend such modifications within this invention as may fall within the scope of the appended claims.

What is claimed is:

1. A valve assembly comprising an axially movable valve stem, a first valve slidably mounted on said stem and engageable with a valve seat, said first valve having a centrally located valve opening, a valve disc on a face of said first valve, a valve seat on the other face of said first valve and surrounding said valve opening, a cylindrical extension on said other face of said first valve and surrounding said valve opening, said cylindrical extension having spaced ports therein, a second valve having a cylindrical portion slidably received within said cylindrical extension, a first restricted passage in the closed end of said second valve, a second restricted passage in the cylindrical portion of said second valve, a second valve disc on said second valve to cooperate with said valve seat on said first valve, the open end of said second valve having an enlarged diameter, a stationarily mounted cylinder having a closed end slidably receiving said enlarged diameter portion of said second valve to form a dashpot therewith, said first and second passages communicating with said dashpot, and means within said dashpot to urge said second valve into seating engagement.

2. In a valve assembly, an axially movable valve stem, a first valve slidably carried on said valve stem, said first valve having a valve opening therein, a cylindrical extension on said first valve and having spaced ports therein, a second valve slidably received in said cylindrical extension, a valve disc mounted upon said second valve to engage said valve opening, a stationary cylinder having a closed end slidably receiving said second valve to form a dashpot therewith, said second valve having a first restricted passage opening into said cylindrical extension and toward said valve opening, there being a second restricted passage in said second valve opening beyond said cylindrical extension.

3. In a valve assembly, a first valve having a valve opening therethrough and a cylindrical extension thereon, such cylindrical extension having a plurality of spaced ports therein, a hollow cylinder having a closed end and slidably received within said cylindrical extension to form a second valve, a valve disc mounted exteriorly on the closed end of said second valve to cooperate with said valve opening, there being an annular space between the periphery of said valve disc and said cylindrical extension, said spaced ports being positioned in said cylindrical extension so as to be closed by said second valve prior to seating of said second valve, a stationarily mounted cylindrical member having a closed end, said cylindrical member receiving the open end of said second valve within its open end to form a dashpot, said second valve having restricted passage means therethrough communicating with said annular space whereby the pressure on said dashpot decreases upon closing of said spaced ports and compression of said annular space to reduce the closing impact of said second valve.

4. In a valve assembly as claimed in claim 3, with said restricted passage means comprising a first hole in the side wall and a second hole in the end wall of said second valve communicating with said annular space.

5. In a valve assembly as claimed in claim 4, with said first hole having a larger diameter than said second hole.

6. A refueling nozzle comprising a valve body having an inlet and an outlet, an annular shoulder in said valve body defining a valve seat and dividing said body into a discharge chamber and a valve chamber, a valve stem slidably mounted in said discharge chamber and extending into said valve chamber, said stem projecting outwardly of said valve body, means on said valve body for imparting axial movement to said valve stem, a first valve slidably mounted on said stem and engageable with said valve seat, said first valve having a valve opening therethrough, a second valve on said stem and engageable with said valve opening, said second valve being opened by axial movement of said stem, said first valve being opened by additional axial movement of said stem, a cylinder stationarily mounted in said valve chamber and slidably receiving said second valve to form a dashpot therewith, and means in said dashpot to urge said first and second valves into closed positions, said second valve having restricted passage means therethrough to communicate with said dashpot whereby pressure may be decreased in said dashpot prior to the closing of said second valve to lessen the closing impact thereof.

7. In a valve assembly, a valve having a flow passage therethrough, a valve stem axially movable in said valve, a first valve slidably carried on said valve stem and interposed in said flow passage, said first valve having a valve opening therein, a second valve mounted on said valve stem and adapted to close said valve opening, said second valve controlling a branch of said flow passage to regulate the flow therethrough, a dashpot attached to said second valve, and restricted passage means in said second valve for decreasing the pressure in said dashpot at a faster rate just before seating of said second valve.

8. In a valve assembly having a flow passage therethrough, an axially movable valve stem, a first valve slidably carried on said valve stem, said first valve having a valve opening therein, a second valve mounted on said valve stem and adapted to close said first valve opening, means for closing said second valve, said first and second valves regulating the flow through said valve assembly, and means for decreasing the speed of said second valve when the flow passage controlled by said second valve is closed but before said second valve is seated to softly close said valve.

References Cited in the file of this patent

UNITED STATES PATENTS

| | | |
|---|---|---|
| 607,732 | Burger | July 19, 1898 |
| 665,247 | Marsh | Jan. 1, 1901 |
| 867,702 | Clarke | Oct. 8, 1907 |
| 931,532 | Wainwright | Aug. 17, 1909 |
| 1,029,464 | Ruwell | June 11, 1912 |
| 1,096,220 | Brooks | May 12, 1914 |
| 1,201,425 | Anderson | Oct. 17, 1916 |
| 1,254,869 | Watrous | Jan. 29, 1918 |
| 1,258,167 | Vollmann | Mar. 5, 1918 |
| 1,315,387 | Murphy | Sept. 9, 1919 |
| 2,357,657 | Jensen | Sept. 5, 1944 |
| 2,661,136 | Huisman | Dec. 1, 1953 |
| 2,687,276 | Hornsby | Aug. 24, 1954 |

FOREIGN PATENTS

| | | |
|---|---|---|
| 454,716 | Great Britain | 1936 |